United States Patent [19]

Rosser et al.

[11] Patent Number: 5,627,915
[45] Date of Patent: May 6, 1997

[54] PATTERN RECOGNITION SYSTEM EMPLOYING UNLIKE TEMPLATES TO DETECT OBJECTS HAVING DISTINCTIVE FEATURES IN A VIDEO FIELD

[75] Inventors: Roy Rosser; Subhodev Das, both of Princeton; Yi Tan; Peter von Kaenel, both of Plainsboro, all of N.J.

[73] Assignee: Princeton Video Image, Inc., Princeton, N.J.

[21] Appl. No.: 381,088

[22] Filed: Jan. 31, 1995

[51] Int. Cl.[6] .................................................. G06K 9/68
[52] U.S. Cl. .................................. 382/219; 382/278
[58] Field of Search ............................. 382/190, 195, 382/209, 219, 226, 227, 278

[56] References Cited

U.S. PATENT DOCUMENTS

| | | | |
|---|---|---|---|
| 4,651,341 | 3/1987 | Nakashima et al. | 382/34 |
| 4,802,231 | 1/1989 | Davis | 382/34 |
| 4,817,175 | 3/1989 | Tenenbaum et al. | 382/41 |
| 4,972,499 | 11/1990 | Kurosawa | 382/38 |
| 5,063,603 | 11/1991 | Burt | 382/37 |
| 5,264,933 | 11/1993 | Rosser et al. | 358/183 |
| 5,353,392 | 10/1994 | Luquet et al. | 395/135 |
| 5,363,212 | 11/1994 | Taniuchi et al. | 358/452 |

FOREIGN PATENT DOCUMENTS

| | | | |
|---|---|---|---|
| 5-101223 | 4/1993 | Japan | 382/209 |
| 90/06691 | 4/1993 | WIPO | H04N 5/275 |

OTHER PUBLICATIONS

English Translation of Japanese Kokai 5–101223, Kawase et al., Apr. 1993.

*Primary Examiner*—Andrew Johns
*Attorney, Agent, or Firm*—Richard C. Woodbridge

[57] ABSTRACT

A system for inserting images into live video fields includes a method for rapidly and efficiently identifying landmarks and objects. Initially a first template, having a first pattern similar to one of the distinctive features of the object, is passed over the video field and compared to it in order to preliminarily identify at least one possible distinctive feature as a candidate. A second template is then created by taking one of the major elements of the distinctive feature candidate and extending that element all the way across the second template and then comparing it to the distinctive feature candidate. This eliminates one or more possible falsely identified features. A third template is then created having a pattern formed from another major element of said distinctive feature and extending it all the way across the third template. The third template is then likewise passed over the distinctive feature candidate and compared therewith in order to eliminate still further falsely identified features. The method is continued until all possible false alarm candidates have been eliminated. The process is then repeated in order to preliminarily identify two or three landmarks of the target object. The locations of those objects are then compared to a geometric model to further verify if the object has been correctly identified. The methodology can be tested against a video taped program to determine if it accurately identifies objects.

27 Claims, 7 Drawing Sheets

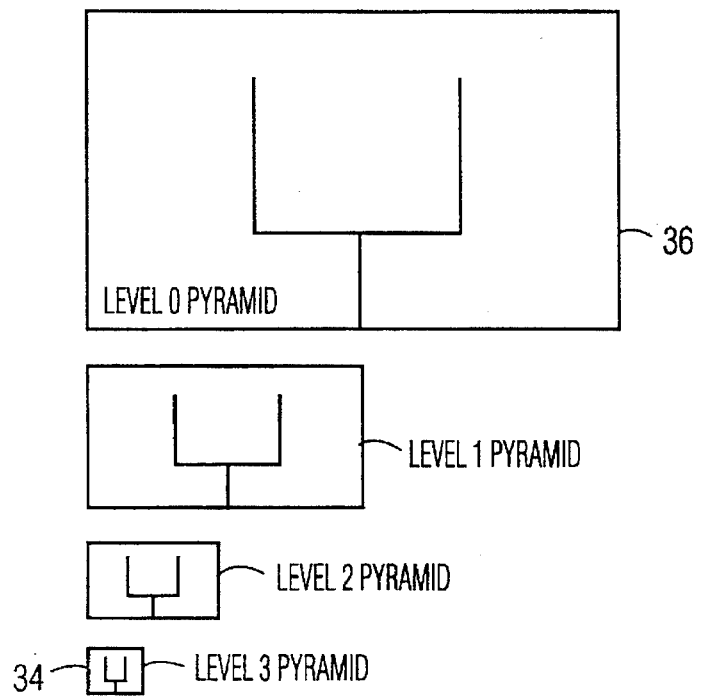
FIG. 2A
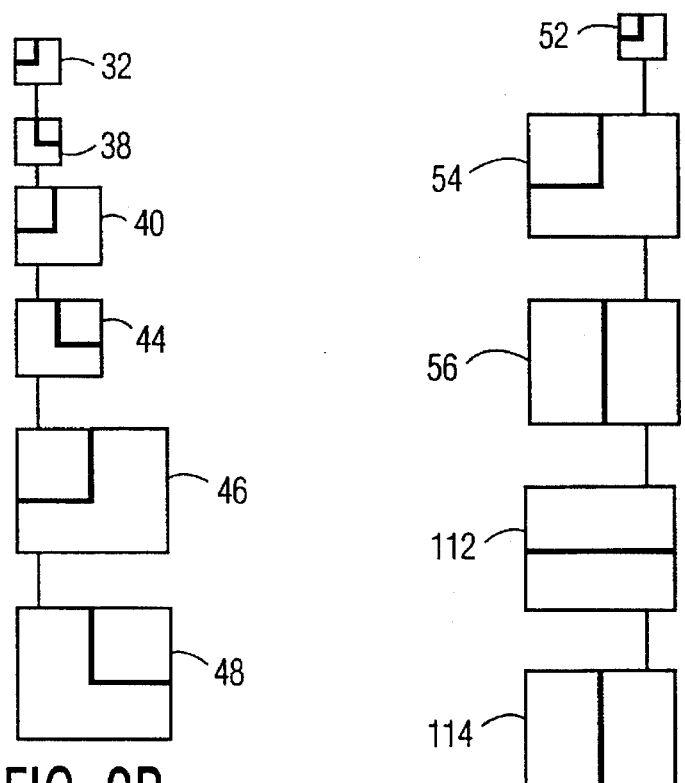
FIG. 2B
PRIOR ART
FIG. 2C

PATTERN RECOGNITION SYSTEM EMPLOYING UNLIKE TEMPLATES TO DETECT OBJECTS HAVING DISTINCTIVE FEATURES IN A VIDEO FIELD

BACKGROUND OF THE INVENTION

1. Field of the Invention

This invention relates to a device for inserting realistic indicia into video images.

2. Description of the Related Art

Electronic devices for inserting electronic images into live video signals, such as described in U.S. Pat. No. 5,264,933 by Rosser, et al., have been developed for the purpose of inserting advertising into broadcast events, especially sports events. These devices are capable of seamlessly and realistically incorporating new logos or other indicia into the original video in real time, even as the original scene is zoomed, panned, or otherwise altered in size or perspective. In addition, in order to use these devices to alter a video feed downstream of the editor's mixing device, electronic insertion devices have to be capable of dealing with scene cuts. This requires recognizing a feature or features reliably and accurately within a very short time, typically a few fields of video or about 1/30th of a second. The need for fast recognition has meant that pyramid processing techniques, as described by Burt, et al., tend to be used. Pyramid processing is a well known technique in which an image is decomposed, sometimes referred to as "decimated," into a series of images, each of which comprises the whole original scene, but each with progressively less detailed information. Typically each successive image will have one quarter of the number of pixels of its predecessor. A level 3 (or third generation) image has 1/64th the number of pixels of the original. A search for a gross feature can thus be done 64 times faster on a level 3 pyramid image and this result quickly related back to the level 0 or original image. Speed is also improvable by searching for a small number of distinct landmarks or features that characterize the target object. This simplification of the search strategy, however, increases the possibility of false alarms or insertions. The enormity of the false alarm problem can be appreciated from the fact that in a typical three hour football game, there are 648,000 fields of video. This means that in a single football game there are at least 600,000 opportunities for the insertion device to do something that would be commercially unacceptable, such as inserting an advertisement in the crowd, or on a group of players, just because of a chance juxtaposition of features that fool the computer into thinking the current scene is equivalent to a scene it is looking to find. To avoid this possibility, or at least reduce the risk of it occurring to an acceptable commercial level, it is necessary to have recognition strategies that, on average, would only make one error in at least twice as many attempts at recognition as would occur in the event being covered. For a three hour football game, the computer must therefore make, on average, no more than one false insertion per 1.3 million fields of video. At the same time the search strategy must be kept sufficiently simple and invariant to changes in lighting conditions, video noise and incidental artifacts that may occur in the scene that it is attempting to recognize, that the recognition strategy can be performed by an affordable computing system in no more than 1/30th of a second. The final problem is that the systems capable of meeting these stringent requirements must be developed in a timely and efficient manner. This includes verifying that performance goals are being attained.

Typically, electronic insertion devices as described in U.S. Pat. No. 5,264,933 have used a dynamic pattern recognition method, as described in detail in U.S. Pat. No. 5,063,603, the teachings of which are incorporated herein by reference. Briefly, as described in PCT WO 93/06691, the preferred prior art dynamic pattern recognition method consists of representing a target pattern within a computer as a set of component patterns in a "pattern tree". Components near the root of the tree typically represent large scale features of the target pattern, while components away from the root represent progressively finer detail. The coarse patterns are represented at reduced resolution, while the detailed patterns are represented at high resolution. The search procedure matches the stored component patterns in the pattern tree to patterns in the scene. A match can be found, for example, by correlating the stored pattern with the image (represented in pyramid format). Patterns are matched sequentially, starting at the root or the tree. As a candidate match is found for each component pattern, its position in the image is used to guide the search for the next component. In this way a complex pattern can be located with relatively little computation. However, such correlation methods, while having the advantage of speed when the search tree is kept to a reasonable size—typically no more than twenty correlation's in current hardware implementations—are liable to significant false turn on rate. This is caused in part by the need for a simple search tree and in part by a problem fundamental to correlation techniques. The fundamental problem with correlation techniques in image pattern match is that the stored pattern for each element of the search tree represents a particular pose of the object being looked for—i.e. a particular magnification and orientation. Even if the system only requires recognition on the same or similar orientation, magnification remains a significant problem as in a typical broadcast application, such as recognizing football goal posts. The difficulty is that the magnification of the goal post in the initial shot (i.e. the first image of the required goal post in a sequence of images containing it) may vary by a factor of two. This means that the stored pattern is in general of the wrong size, making the correlation's weaker than in the case where the search pattern matches the image pattern exactly and thus more difficult to distinguish from other partially similar features. Traditional attempts to deal with this have been to include search trees containing images of different pose, particularly magnification. This results in longer search trees, and slower recognition. This is taken to an extreme in the system described in U.S. Pat. No. 5,353,392 by Laquent in which all attempts to automatically cope with scene cuts are abandoned and the identifying marks are indicated manually on the first image of each sequence. This may be adequate for a none real time editing machine, or for a real time electronic insertion device attached to a single camera in a situation where the recognition landmarks are never fully occluded, but is unacceptable in a standard broadcast environment with the electronic insertion occurring downstream of the editor's switching equipment, or at a remote location.

In U.S. Pat. No. 4,817,175, Tenenbaum, et al., describes a pattern recognition system which uses parallel processing of the video input to attain speed. This system is directed towards inspection techniques in which the camera is under control of the recognition system and in which real-time performance is not required. The Tenenbaum, et al. system, therefore, uses time averaging of a number of frames of video to obtain high signal-to-noise in the image. The heart of that recognition strategy, which in the preferred embodiment is set up to locate rectangles of varying size, is to look for corners, because of their invariance to magnification, using corner templates and standard correlation techniques. As an example, Tenenbaum, et al. describes a system which has templates representing a corner at all possible orientations. This is used to locate all possible lower left hand corners of possible rectangles. From these, the system detects corners and then looks along the diagonal for the matching upper right hand corner, using only the corner template having the correct pose. Finally, the system uses the predicted location of the other two corners of the rectangle as a means of confirming the existence of the rectangle, again using corner templates in the correct pose. All correlation is done in the traditional manner, using like templates.

The existing methods of structured pattern recognition used in electronic insertion devices require either relatively long and complex search trees, resulting in prior art methods taking too much time with existing hardware to be of use in a real time, multi-camera environment under the range of conditions required by conventional broadcast practice or if the search trees are kept sufficiently simple, the search strategies become fragile, making them overly sensitive to false alarms in complex or noisy images, both of which are part of a real television broadcast.

SUMMARY OF THE INVENTION

Briefly described, the invention comprises an improved method for the recognition of target patterns in a digitized image. The preferred method of the invention combines speed of search with robustness in practical environments, especially to false alarms. The method includes all the tools for successfully implementing the method in a practical situation.

The preferred method uses a structured search tree, in which the initial elements of the are kept simple, comprising zoom invariant features such as corners or edges. Then in the "outer branches" of the search tree, the method of the invention is to switch from standard matching techniques (i.e. correlation of a given pattern looking for a match to the same pattern in the image), to a technique referred to here as "unlike feature correlation" in which patterns of one feature are deliberately used in a correlation over an area we believe to comprise another feature. For example, a pattern of a line is correlated centered on a part of an image we believe to be a left handed corner. Suitable interpretation of the resultant correlation pattern of the two unlike features allows the method, for example, to verify the existence of a left hand corner very quickly and accurately. Thus it is possible to keep the speed of structured pattern recognition with simple trees, without incurring their fragility to either different magnification or false turn on in complex images. This immunity to false alarm allows the system to further speed up the search by running several search strategies in parallel. (Each search strategy has to be twice as immune to false alarm in order to run two in parallel without impacting the total sensitivity to false alarm. Similarly 3 search strategies run in parallel require each to be 3 times as immune to false alarm and so on). As a means of attempting to reduce the false alarm rate, it is common practice, having located a target with an initial search strategy, to verify this target by running correlation matches at a relatively large number (10-20) parts of the image, looking to find correlation values above a certain threshold. Because correlations are usually run over a reasonable number of pixels—from 3 to 15—this technique is a good positive confirmation, but is very open to false alarm. By using simple search-patterns, but then interpolating around the position of the maximum correlation, the system first gets sub-pixel information about the location of part of the feature, and then the system uses a very strict geometrical check of the relative location of the parts of the scene it is attempting to find.

The combined strategy of search trees with built in "other feature correlation" feature verifiers, and the subsequent structure verification by a strict sub-pixel geometrical check of known relative positions of the overall structure, provides electronic insertion devices with the ability to accurately identify features within a full video image within one to two video fields, with a false turn on rates in the 1 in 2 million range on random video fields, which is roughly two orders of magnitude better than the conventional search tree strategies with just the peak value check of the structure.

The final part of the invention which allows this improvement in performance to be implemented on a routine basis is the verification or test part of the strategy. This has two parts. Firstly, the straight forward automatic logging of false alarms, including the capture of the image that caused the false alarm. This allows strategies to be tested over a large number of random frames. The second part of the test strategy first requires a reiteration of the way electronic video insertion devices operate. Having found the required object with the initial search strategy, the assumption is that for a while, the video will display a continuous scene, in which each video field is very similar to the previous one, with only relatively small changes in magnification, translation, with a smaller amount of shear or rotation. On these subsequent fields, the computer thus has the much simpler task of, given the objects position and size in one field, finding it in the next. Totally different and much simpler strategies are then able to track the object from field to field. The test strategy to allow rapid assessment of the robustness of the preferred search-strategy is to force the system back to doing a search from scratch on every field or frame of video, even if the previous one was successful. This simple, but novel test allows the system to use relatively short video sequences to assess how given search trees will perform over a large number of initial scenes.

The combined search and testing strategies comprise a method of producing practical, robust search mechanisms that allow electronic insertion devices to be used in real time in realistic broadcast environments and, if necessary, with multi-camera feeds and downstream of editing and video effects machines.

BRIEF DESCRIPTION OF THE DRAWINGS

FIG. 2a is a schematic representation of pyramid decimation of an image as used in the preferred embodiment.

FIG. 2b illustrates both a schematic representation of a search tree as used in the prior art.

FIG. 2c illustrates a search tree as used in the preferred embodiment.

DETAILED DESCRIPTION OF THE PREFERRED EMBODIMENT

Figure 1:
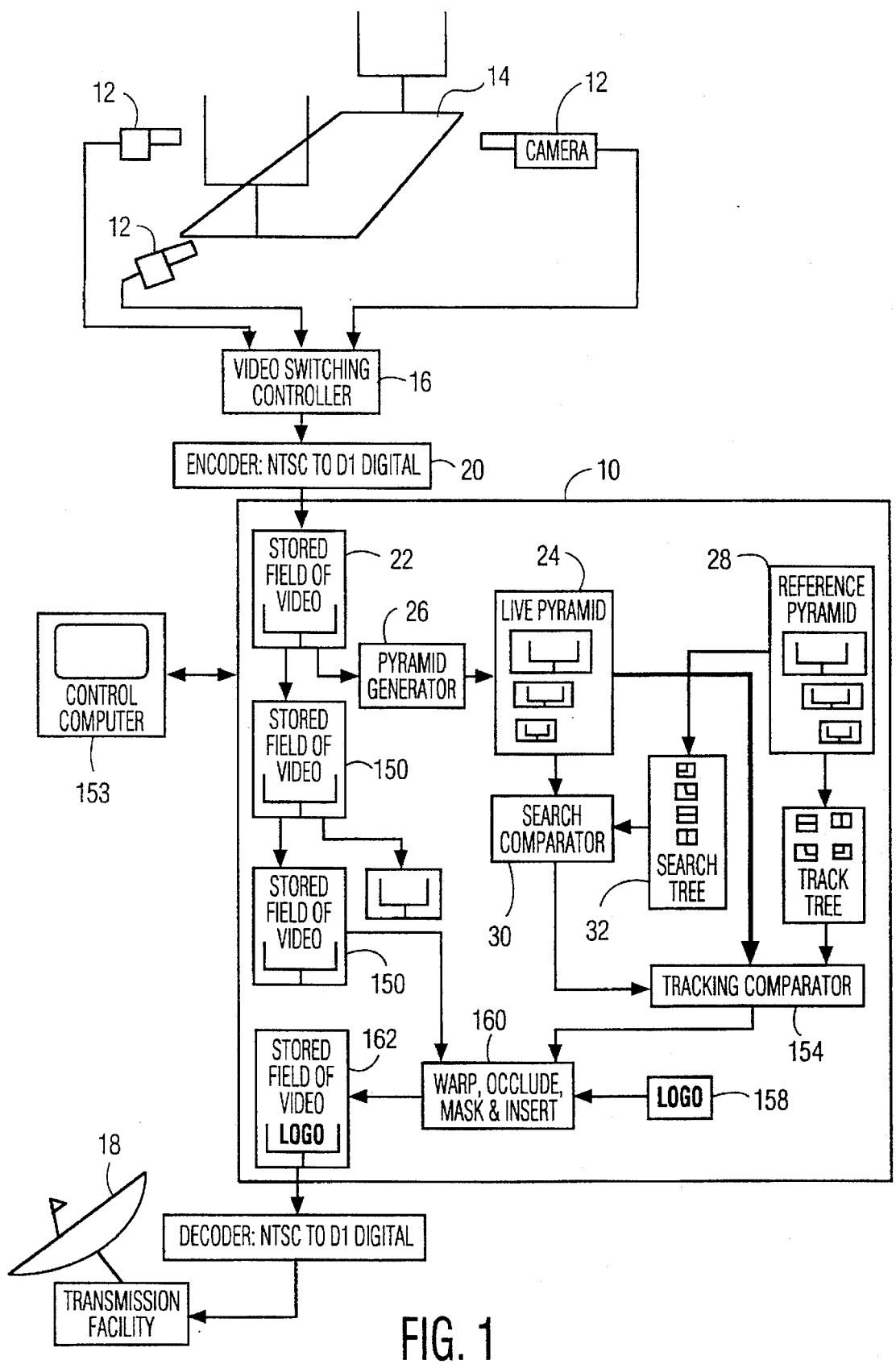
FIG. 1 is a schematic representation of a live video insertion system, according to the preferred embodiment of the invention.

During the course of this description like numbers will be used to identify like elements according to the different figures which illustrate the invention. To understand the invention it is easiest to take component parts and look at each in turn.

The method of the unlike feature correlation is best understood by considering how electronic insertion devices do rapid pattern recognition.

The electronic insertion system 10 gets an image taken by a conventional television camera 12 of a scene 14. The views from different cameras 12 are routed through an editor's switching controller 16 by means of which the director of the program (typically a trained human, not shown) edits together different camera shots to produce the television program that is sent to the end viewer over the network. Before the television program is sent over the network by means such as a broadcast antenna 18, the video feed is passed through the electronic insertion device 10. In this the incoming signal, typically in analog NTSC format, is converted into a digital format by an encoder 20. The digital image 22 is then converted into a pyramid of images 24 by a pyramid producing device 26. The pyramid of the incoming live image 24 is then compared against a pyramid of a prestored reference image 28 which contains the target being looked for. This comparison of incoming live image against the prestored reference image is done by a search comparator device 30 using a search tree of templates 32 which comprises a sequence of small (typically 8 pixel by 8 pixel) sub-images (or templates) taken from the pyramid of the reference image 28. The search device 30 uses these search templates 32 in a predetermined sequence in order to rapidly ascertain if the sought after target appears in the current image of interest and, if so, in what pose—i.e. what is the target's current magnification, translation and rotation with respect to the target represented in the pyramid of the reference image 28. The unlike feature correlation part of this invention is an improvement to existing practice which allows the search device 30 to do a rapid and robust search for the target. In a conventional dynamic pattern recognition search, as detailed in, for instance, U.S. Pat. No. 5,063,603, a typical search tree looks like that shown schematically in FIG. 2b. The first node 32 is an eight by eight pixel sub-image of the level 3 reference image 34 (derived by 3 sequences of appropriate decimation from the level 0 image 36) representing, for example, a right hand corner of a football goal post. The pyramid may, in addition, be Gaussian filtered, or Laplacian filtered (or any other suitable filtering), as discussed in detail by Burt. A typical mode of search is to step through the level 3 pyramid of the incoming image in a raster fashion doing correlations with the first node template 32. At level 3, in an NTSC system, the size of the image of a single field is 90 pixels long by 30 pixels deep. Using a hardware correlator that can do correlations over a 15 by 15 region in a single pass, such as the Data Cube MaxVideo 20 hardware board, the first node of the search tree can be searched for in 12 passes or correlations, each of which takes about 1 millisecond. (A field time of NTSC video is 1/60th of second, or 16.6 milliseconds). The maximum correlation is found and, if above an experimentally determined threshold, it is assumed to have found a right hand corner, as that is the pattern that will give the single highest match or correlation. Having found the right hand corner, the search algorithm then looks to see if there is a left hand corner in the appropriate place. It does this by taking the template 38 of a left hand corner taken from the reference pyramid image 34, and does a single correlation at the offset from the position of the right hand corner just located, based on the distance between corners in the reference level 3 image 34. The magnification between the incoming live image and the prestored reference image is assumed to be 1.0. Because the correlation is over a 15 by 15 region there is some tolerance in the magnification of the incoming image that can be detected, even with this initial assumption that the incoming image has the same magnification as the reference image. This tolerance varies with the size of the feature being looked for. For example, if the goalpost in the reference level 3 image spans half the image, i.e., is 45 pixels wide, the allowed range of magnification for the search to be successful is ±18% of the reference image.

If at the predicted location, a correlation of the right hand reference template 38, produces a peak value greater than a predetermined threshold, then a matching left hand corner is assumed to have been found. Based on the position indicated by the location of the maximum correlation, the search algorithm updates the estimate of the magnification of the incoming image with respect to the reference image. The search then proceeds to the next search template, 40 which in this example is the level 2 right hand corner, and runs a correlation using the position of the right hand corner predicted by the level 1 search. The maximum of this correlation is assumed to be a more accurate position for the right hand corner of the goalpost. Using the magnification of the incoming image with respect to the reference image calculated in the level three part of the search, the algorithm then looks for the right hand corner of the goal post with the right hand goal post reference template 44. As before, the peak correlation position, if above an acceptable threshold, is assumed to be a more accurate position of the right hand post in the incoming image. The procedure may be repeated one more time using level one templates 46 and 48 taken from the level 1 reference pyramid image 50 for greater positional accuracy. The total search of this example takes 17 correlations, or just over one field, with a magnification tolerance of roughly ±20%. However, the simplicity of the search tree and its having only an experimentally determined threshold to indicate whether or not a match between template and image really indicate the location of a feature, would result in an unacceptably large number of false positive matches.

By contrast, a typical search tree employed by the method of the preferred embodiment of this invention, i.e., unlike feature correlation, is shown in FIG. 2c. The target of the search is the same as in the previous example. The method of unlike feature correlation starts in a similar manner, using a level 3 pyramid of the right hand corner 52, and does an exhaustive search of the level 3 pyramid of the incoming pyramid image in 12 correlations of 15 by 15. As before, it initially assumes that maximum peak of all 12 correlations indicates a right hand corner. The search then takes a level 1 right hand corner template 54 and does a correlation of this pattern on the level 1 pyramid of the incoming image in order to get an accurate position of the right hand corner. The next step is to do an unlike feature correlation of a vertical line template 56 centered on the suspected corner. This is done to verify that the corner is indeed a corner and not some similar geometric figure that would give a similar correlation.

Figure 3:
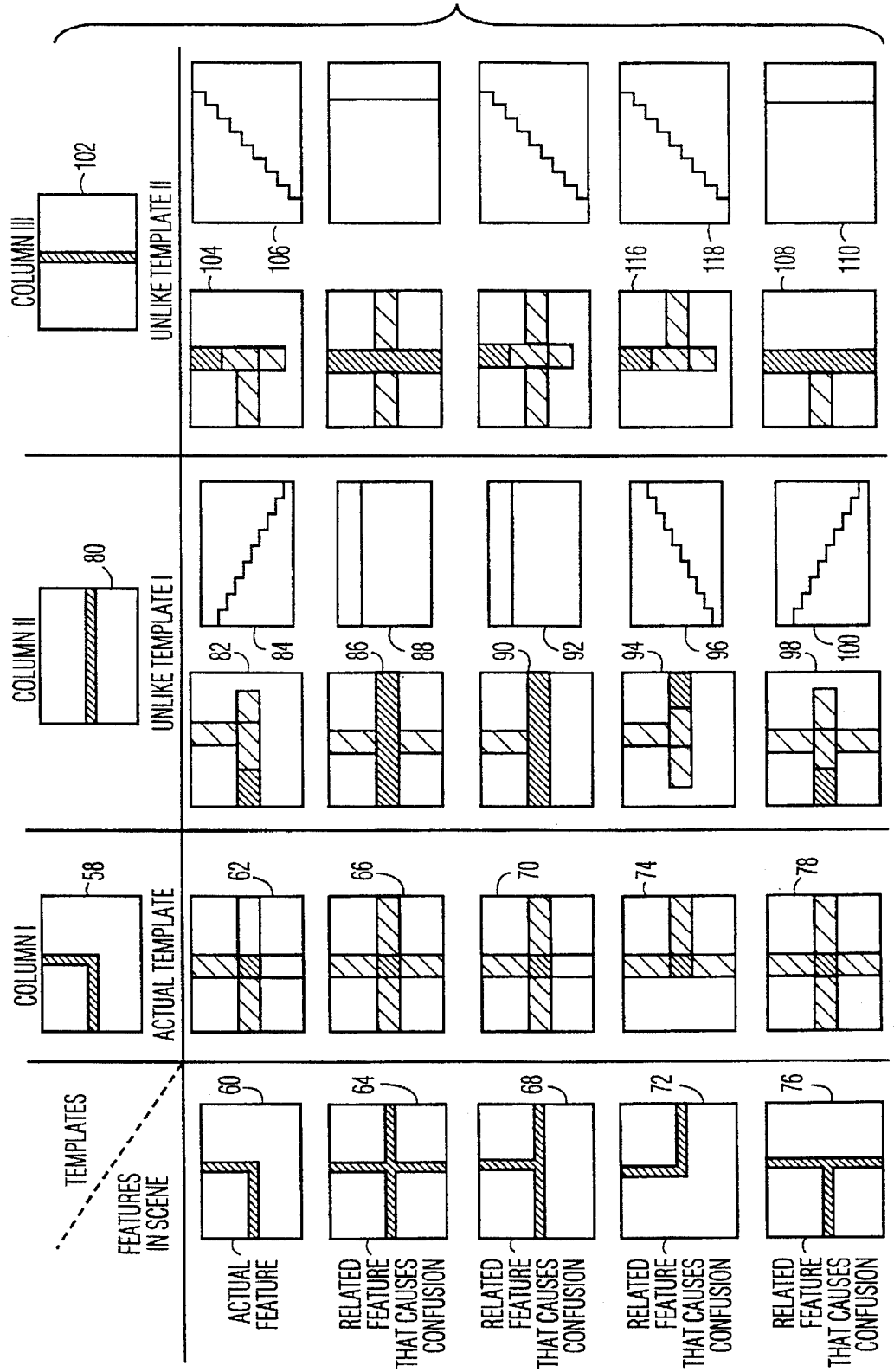
FIG. 3 is a diagrammatic representation of both reference templates, objects in the scene, and the corresponding correlation surfaces that are generated when both like and unlike correlations are performed.

To understand the power of the method of unlike correlation in distinguishing between similar geometrical objects, it is first necessary to consider how conventional techniques of identifying a pattern by correlation with a like pattern can lead to errors. FIG. 3 shows how a reference template of a right hand corner 58, when correlated against a right hand corner 60 gives correlation surface 62, which is in practice indistinguishable from the correlation surface 66 resulting from the correlation of the right hand corner template 58 against a cross 64. Similarly, the correlation of the right hand corner template 58 against a T feature 68 results in a correlation surface 70, indistinguishable in a real, noisy environment from correlation surface 62. Even the correlation of the right hand corner template 58 against a left hand corner image 72 results in a correlation surface 74, which will, in general have a lower maximum than the correlation surface 62, but is so similar in structure that in a noisy practical environment may easily be mistaken for the correlation surface 62. As a final example the result of correlating the right hand corner template 58 against a vertical T image 76 is shown in the correlation surface 78. Once again the differences between the correlation surface 78 and 62 are subtle variations in values, easily confused by noise, variations in magnification or changes in intensity.

Columns 2 and three of FIG. 3 show examples of unlike feature correlation. In these the correlation surfaces provide robust evidence to verify that the object is a right hand corner or reject it as being some other geometrical shape.

In column 2, the horizontal bar template 80 is correlated against the right hand corner template 60, resulting in the correlation surface 82, an intensity map of the central row of the surface 82 is also shown 84. This correlation surface 82 has the distinguishing features that the maximum intensity occurs at the extreme left hand corner and that the intensity of the central row falls off sharply, in a predictable staircase as shown in 84. By contrast, the correlation surface 86 obtained by correlating the horizontal bar template 80 against the cross feature 64 is a single bar of near uniform intensity, as seen from the intensity map of the peak row 88. This correlation surface is readably distinguishable from the required correlation surface 82. Similarly, the correlation of the horizontal bar 80 against a horizontal, inverted, T 68 and a left hand corner 72 result in the correlation surfaces 90 and 94, with corresponding intensity maps of the peak row 92 and 96. Both correlation surfaces 90 and 94 are readily distinguishable from the correct surface 82. Only in the case of the correlation of the horizontal bar 80 against a vertical T 76 are the resultant correlation surface 98 and peak row intensity map 100 virtually indistinguishable from the correct correlation surface 82. However, in this case the correlation of a vertical bar 102 shown in the right hand corner can be used in conjunction with the horizontal bar. This can be seen by comparing the correlation surface 104 obtained by correlating the vertical bar 102 against a right hand corner 60, with the very different correlation surface 108 obtained from correlating the vertical bar 102 against the vertical T 76. The correlation surfaces 108 and 104 are readily distinguishable.

From FIG. 3 it is clear that there are ambiguities inherent in the correlation process in which a reference template of the object being sought, is correlated over an image, or portion of an image, looking for the best match. These ambiguities stem from the fact that related geometrical elements can lead to false peaks with very similar correlation surfaces. In addition, it is clear from FIG. 3 that these ambiguities can be resolved in a practical way by further correlations of suitably chosen reference templates, deliberately unlike the object being sought, alone or in combination with each other. The key feature is that the unlike templates lead to correlation surfaces that differ not merely in subtle changes of peak intensity, but have predictable geometric structures which are markedly different even for related geometrical structures.

The search tree of the unlike correlation method of the invention locates a candidate right hand corner by correlation of the level 3 right hand corner template 52 on the level 3 incoming image. The position of the most likely candidate is chosen, and its location defined more accurately by a level 1 correlation using the level 1 right hand template 54. A check is then done to see if the candidate really is a right hand corner by first doing a level one unlike correlation using a vertical line 56, and checking both that the peak of that correlation occurs in one of the upper three positions of the peak row of the correlation surface, as shown in 104, and that the intensity of the peak row falls off rapidly as show in 106. If the candidate corner does not match, it is possible to go back to the second most likely candidate in the initial level 3 search, and investigate that. If the candidate does pass the vertical bar test, it can be further investigated by the level 1 horizontal bar reference template 112. The correlation surface should now correspond to that shown in 82 and the intensity of the peak row to that in 84. From these two tests it is now evident that we have located a right hand corner. The left hand corner can then be sought using the reference template 112, and doing the correlation one step to the left of the position of the right hand corner. This stepping allows us to simultaneously check for continuity of the horizontal bar and to determine that when we do reach the end, the peak line of the correlation surface falls of in the appropriate staircase fashion indicated by the correlation surface 94 in FIG. 3. A final verification to ensure that the search has arrived at a left hand corner would be to run a correlation of a level 1 vertical bar reference template 114 and check against the expected correlation surface 116 with a corresponding map of peak row intensity 118.

The total search indicated would take about 19 correlations (assuming the stepping along the bar takes 4 level 1 correlations, covering 60 pixels or 0.16 of the image. The stepping may be done at either level 2 or level 3 to increase the span for a given number of correlations). There are obvious extensions to the use of unlike feature correlations such as checking for ends of lines. The principal advantages of the unlike correlation method are that by doing strict element analysis early on it not only drastically reduces the number of false alarms, but does so early enough to allow lesser candidates to be considered without wasting correlations researching the entire image.

Figure 4A:
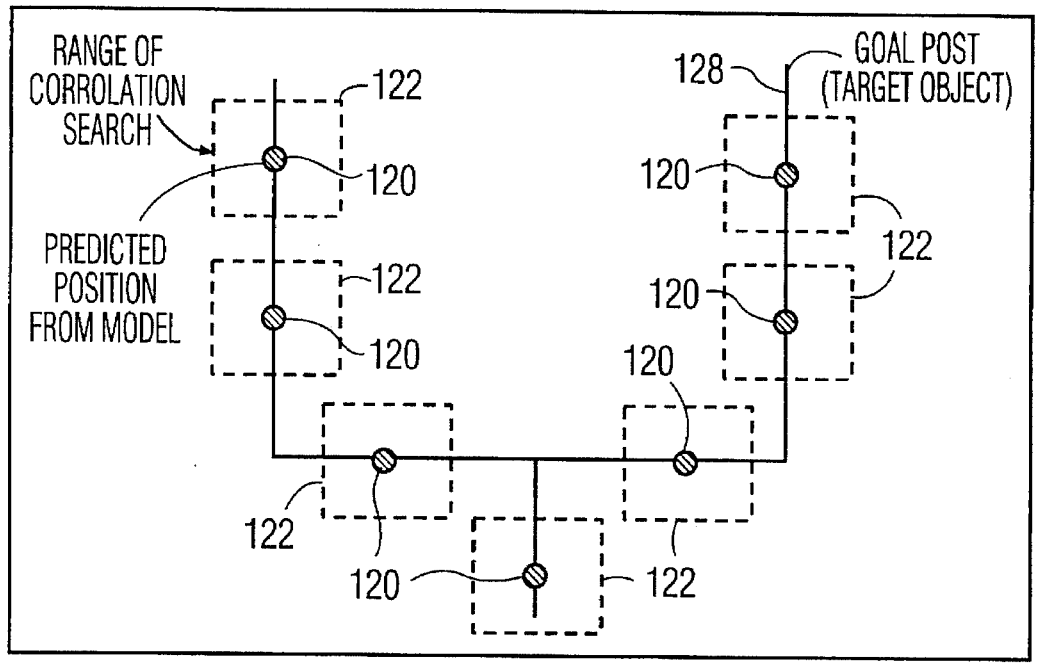
FIG. 4a illustrates the method of verifying existence of a specific object by multiple correlation, as used in the prior art.
Figure 4B:
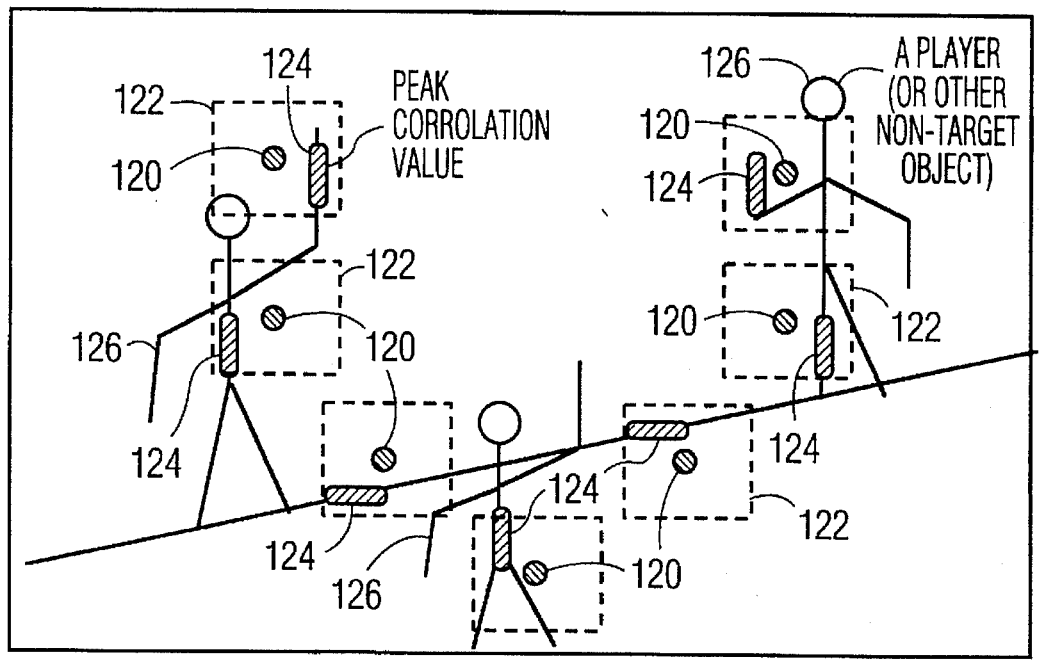
FIG. 4b illustrates an example of mismatch when using only the verification of existence of a specific object by multiple correlation.

Having done a rapid search, the next phase of the conventional live video insertion system is to do a verification by doing a larger number of correlations (typically between 10 and 15 with existing Datacube Max20 hardware) on the level 1 pyramid of the incoming image to further check that the object identified is in fact the object being sought. As illustrated in FIG. 4a, these correlations are centered on points 120 that model the target in the incoming image using the pose (translation, magnification and rotation) identified by the search. Although the verification does cut down on the number of false alarms, it has a problem shown in FIG. 4b. Here, although the target is not in view, because each of the correlations, though centered on the model 120, extends over a range of 15 by 15 pixels 122, so that a random collection of arbitrary objects 126 (players, for example) can give rise to correlations whose peak value 124 is above the required experimental threshold indicating an adequate match). The result is that the algorithm treats the random collection of arbitrary objects as being equivalent to having verified the existence of the goalpost 128. This effect can be reduced by reducing the area 122 over which the correlation's are done or even more effectively, by first doing sub-pixel interpolation on the correlation surfaces to determine the exact coordinates of the matches 124, and then checking that these coordinates are aligned to each other to fit a model of the search object (i.e. goalpost 128) to sub-pixel accuracy. This geometric check of the verification stage is an important adjunct to the unlike correlations checks. Combined they allow the simple correlation search strategies detailed above to achieve rapid (less than 1/30th of a second) positive recognition, with false turn on rates greater than 1 in 1 million attempts, which is about two orders of magnitude better than the same fast correlation techniques without the two levels of checking.

Figure 5:
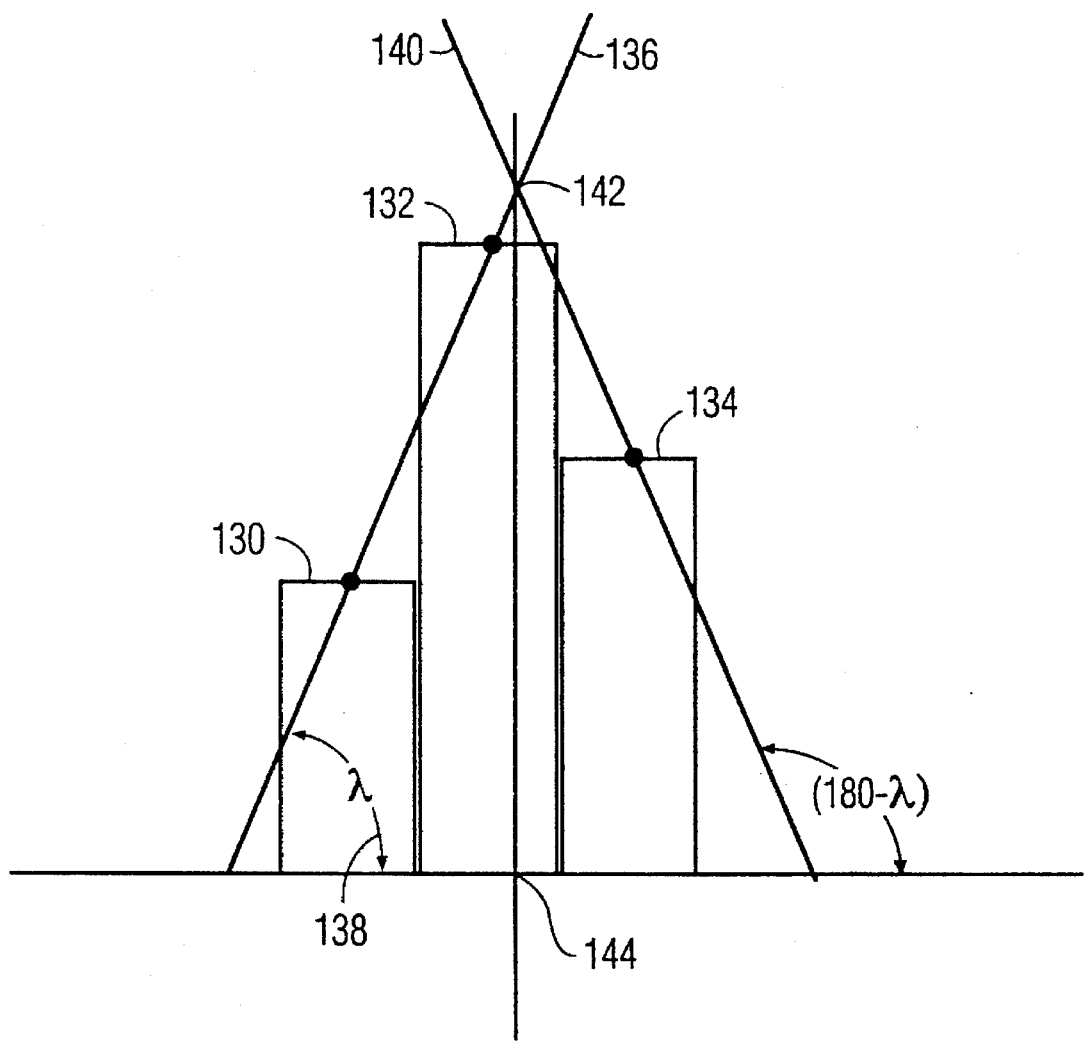
FIG. 5 illustrates the 2-D method of sub-pixel interpolation on correlation surfaces.

Sub-pixel interpolation at a verification stage is known. It is an infrequently used and poorly documented, but very effective technique, and is illustrated in FIG. 5 for a one dimensional case. The peak correlation value 132 and the two values on either side of it, 130 and 134 are considered. The first step is to determine which is the smaller of the two values on either side of the peak 132, which in FIG. 5 is 130. A line 136 is then drawn through the peak 132 and the lesser value 130 to obtain the angle 138. A second line 140 is then drawn through the higher peak 134 at an angle to the horizontal which is 180 degrees minus the angle 138. The intersection 142 of the two lines 136 and 140 give subpixel value 144 of the correlation. This method of reconstructing a triangle has some theoretical justification in that the correlation of a rectangle function with itself is a triangle. The method has also been found to be the most consistent and accurate experimentally and can readily be extended to the two dimensional case. This sub-pixel technique, though occasionally used in other contexts, lends itself well to usage with the novel aspects of this invention.

The search strategy detailed above, with the unlike correlation checks and the final geometrical check provides a means of getting the positive search and the false search patterns down to an acceptable minimum. The final part of being able to implement such searches in practice and know that they will perform as required is to have appropriate tools for checking them effectively.

Figure 6:
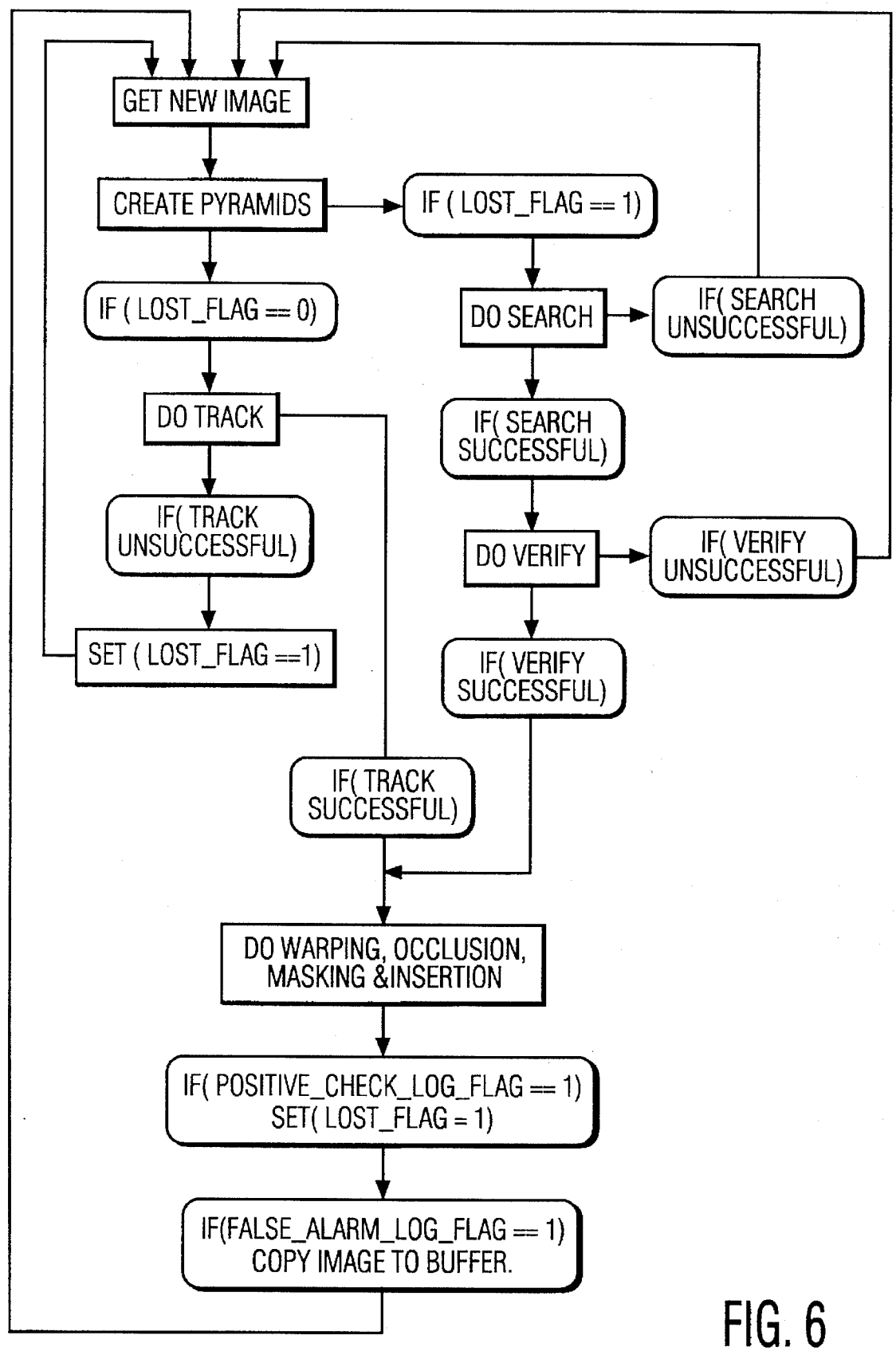
FIG. 6 is a flow diagram of a live video insertion system incorporating the modifications of the preferred embodiment.

The false alarm case can be handled most readily by having a simple logging function incorporated in the software as shown in the flow chart in FIG. 6.

This logging function, when activated, stores the first image the machine sees each time it turns on. This may be done by directly loading down one of the delay memories 150 in FIG. 1, or by first copying that image to a special memory surface 152, which is not in the stream of continuous video and then down loading that memory in non real time to the control computer 153. The system can then be run unattended for extended periods of time, (i.e. overnight, which is roughly 2 million fields of video) and effectively watch a random video stream. At the end of the period, i.e. the next morning, an operator can then see how many images the machine recognized, and which ones they where. This not only allows the false turn on rate to be calculated, but gives the operator insight into what caused the false turn-ons, allowing the operator to take corrective action by altering the search strategy if necessary.

The positive turn on testing requires a more subtle tool, also indicted in the flow diagram in FIG. 6. Because the testing is typically done from a limited set of tape recordings of a prior event in the same stadium, and because once the search has been successfully completed, the live video insertion machine 10 switches into a tracking mode, in which the tracking comparator 154 compares a set of tracking templates 156 with the incoming scene, bypassing the search comparator 30, the operator would typically only have a limited number of transition scenes at which the machine does its recognition. However, by incorporating a flag that allows the machine to always fail after one insertion, i.e. after the logo stored in memory 158 has been combined with the actual, delayed video 150 using the warp, mask occlude and insert module 160 to give the final composite output 162, the machine can be required to attempt to recognize every video field in a given sequence. This always fail flag allows an operator to very quickly see, even on a limited tape sample of a prior game, if the current search strategy would be applicable over any of the camera angles and magnifications that might be an initial field in some future game.

The unlike correlation method of the preferred embodiment illustrated in FIGS. 1–3 may be thought of as one particular, and efficient, implementation of a more general method for invariant linear feature detection by correlation. Invariant linear features are defined as ones that in a two dimensional plane provide x and y information, but whose appearance is independent of zoom—i.e., the features look the same at any zoom.

Figures 7A, 7B:
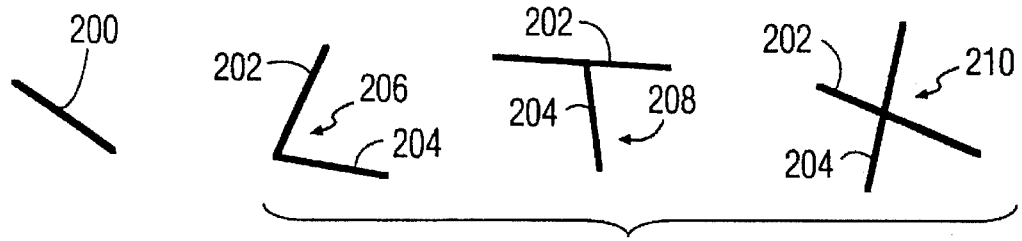
FIGS. 7A–7C show the three classes of two dimensional linear invariant features of the type that the preferred embodiment of the invention may seek to identify.
Figure 7C:
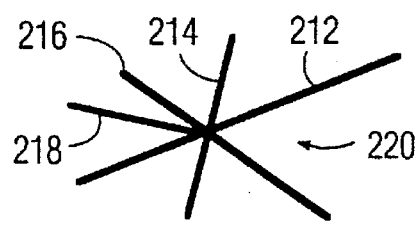

Three classes of 2—dimensional linear invariant features are shown in FIGS. 7a–7c.

The simplest invariant linear feature is a line 200, of any orientation, that ends within the region of interest as shown in FIG. 7a.

The next most complex, and the most practically useful set, of invariant linear features consist of two lines shown as 202 and 204 in FIG. 7b, of any orientation, though not identical, which either meet, or cross. As shown in FIG. 7b there are three cases of such lines: either they meet at two endpoints as shown by feature 206 (L shaped); or they meet at one end point as shown by feature 208 (T shaped); or they intersect each other as shown by feature 208 (X shaped).

Three or more lines such as lines 212, 214, 216 and 218 illustrated in FIG. 7c are only zoom invariant if they meet or cross at a single point as shown by feature 220. Such structures are less common in video images.

The case of two orthogonal lines 302 and 304 illustrated in FIG. 8 meeting at a point as a reverse L shaped feature 300 will be discussed as an example, though it will be clear that the generalized method can be adapted for many sophisticated cases of zoom invariant linear features.

Figure 8:
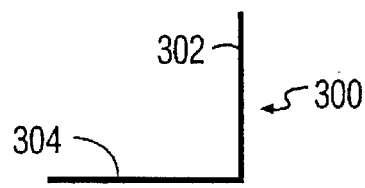
FIG. 8 illustrates a reverse L shaped target.

A reversed L shaped feature 300 as shown in FIG. 8 can be detected with a considerably reduced chance of confusion with related two line structures by maximizing the function T:

$$T = \Sigma[\Sigma P(col, 90, n, m+v) - \Sigma P(row, O, n-h, m) + \Sigma P(row, O, n+h, m) - \Sigma P(col, 90, n, m-v)] = \text{maximum}$$

where the term $\Sigma P(col, 90, n, m+y)$ is interpreted as being the sum of the values of the peak column of the correlation of a line at 90 degrees to the horizontal (i.e., a vertical line template), centered at the nth horizontal correlation position, and the mth vertical correlation position). As the correlation of a line with a line gives a correlation surface with a corresponding line of high values. By summing the peaks along the correlation surface, a first check on the existence of the line is possible. Some degree of continuity is also implicit in the summing along a peak row or column. However, if the time or compute power are available, more discriminating go-nogo checks may be included, such as checking on either side of the column with the highest sum of correlations for either a column with negative sum, or individual negative values. The variance of the individual values in the peak column, or other statistical quantity may also be included, either as a go-nogo check or as a weighting factor in slightly modified variants of the function T defined above.

Figure 9:
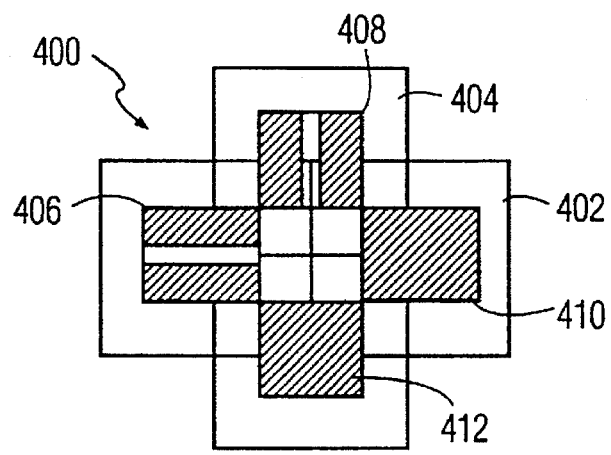
FIG. 9 shows four linked correlation surfaces used to create a function which illustrates a generalized, highly certain method for detecting linear invariant features.

FIG. 9 illustrates more specifically the correlation surfaces 400 generated when looking for the reverse L-shaped feature 300 of FIG. 8. A first correlation search rectangle looks for row correlation and generates a first and a second pair of correlation surfaces 406 and 410. We know that we have likely identified the horizontal row feature 304 of the reverse L-shaped feature 300 when 406 is maximum and 410 is minimum. Correlation surface 406 correlates the horizontal line 304, centered on correlation point (n–h, m) and correlation surface 410 is the resulting correlation surface centered on correlation position (n+h, m). Likewise, the correlation search rectangle 404 produces two correlation surfaces 408 and 412 which look for column feature 302 of reverse L-shaped feature 300 of FIG. 8. Correlation surface 408 correlates with vertical line 302 and is centered on correlation position (n, m+v) and correlation surface 412 is centered on position (n, m–v). Feature 302 is detected when correlation surface 408 is maximum and 412 is minimum. Therefore, the total reverse L-shaped feature 300 is detected when the function sum or total (T) is maximum or $$T = \text{surface } 406 - \text{surface } 410 + \text{surface } 408 - \text{surface } 412 = \text{maximum}$$

This can be further generalized for the two orthogonal lines case (FIG. 7b) as follows:

$$T = \Sigma[\Sigma row_1 \pm \Sigma row_2 + \Sigma col_1 \pm \Sigma col_2] = \text{maximum}$$

If the two lines are straight but not orthogonal this can be generalized as follows:

$$T = \Sigma[\Sigma row\alpha_1 \pm \Sigma row\alpha_1 \pm 180° + \Sigma col\alpha_2 \pm \Sigma col\alpha_2 \pm 180°] = \text{maximum}$$

where $\alpha_1$=angle of line 1 with respect to abscissa (x axis)
$\alpha_2$=angle of line 2 with respect to abscissa (x axis)

For a multiline system of straight lines converging at a point with angles of intersection of $\alpha_1, \alpha_2, \ldots \alpha_8$ the generalized function T can be expressed as $$T = \sum_{i=1}^{\alpha} [\Sigma P\alpha_i(m,n) \pm \Sigma P\alpha_i(m+v, n+h)] = \text{maximum}$$

where v=vertical distance between m and m+v
h=horizontal distance between n and n+h For practical purposes there are generally going to be at least two straight lines converging at a point so $$T = \sum_{i=1}^{\alpha} [\Sigma P\alpha_i(m,n) \pm \Sigma P\alpha_i(m+v, n+h)] = \text{maximum}$$

where i=2 or greater

While the invention has been described with reference to a preferred embodiment, it will be appreciated by those of ordinary skill in the art that changes can be made to the structure and operation of the invention without departing from the spirit and structure of the invention as a whole.

We claim:

1. A pattern recognition method for recognizing an object having distinctive features as imaged in a video field, said method comprising the steps of:

(a) passing a first template having a first pattern similar to one of said distinctive features over said video field and comparing the same in order to preliminarily identify at least one possible distinctive feature of said object which could either be a correctly identified distinctive feature or one of a plurality of incorrectly identified features;

(b) passing a second template having a second pattern different from said first template pattern over said possible distinctive feature and comparing the same in order to determine if said possible distinctive feature is at least one of said incorrectly identified features;

(c) passing a third template having a third pattern different from said first and second template patterns over said possible distinctive feature and comparing the same in order to determine if said possible distinctive feature is at least another of said incorrectly identified features;

(d) repeating steps (b) and (c) above until all possible likely falsely identified features have been eliminated as possible candidates for said distinctive feature;

(e) selecting said second pattern, wherein said second pattern includes a first element of said distinctive feature which extends substantially completely across said second template, wherein said correctly identified feature is accurately identified by process of elimination.

2. The method of claim 1 further comprising the step of:

(f) Selecting said third pattern, wherein said third pattern includes a second element of said distinctive feature which extends substantially completely across third template.

3. The method of claim 2 further comprising the steps of:

(g) repeating steps (a)–(f) above to locate at least two potential distinctive features of said object; and, (h) geometrically comparing the location of said at least two potential distinctive features of said object against a geometric model of said object to further determine if said object has been correctly identified.

4. The method of claim 3 further comprising the step of:

(i) recording a series of consecutive video frames and verifying the accuracy of said method for recognizing an object by testing it against said series of video frames over a period of time to determine if it has correctly identified said object.

5. The method of claim 4 further comprising the step of:

(j) determining the sub-pixel maximum value of at least a first, second and third pixel each having a top with a midpoint and all having a common baseline by forming a first line through the midpoint of the top of said first and second pixels, said first line forming an angle α with respect to said common baseline and subsequently drawing a second line through the top midpoint of said third pixel, said second line having an angle 180°—α with respect to said common baseline, wherein the triangular intersection of said first and second lines approximates the location of the maximum value of said three pixels.

6. The method of claim 5 further comprising the step of:

(k) inserting an always fail flag into the end of each frame tested in step (i) thereby forcing the method to repeat steps (a)–(f) at least once per field, wherein an effort is made to recognize said object once each frame.

7. The method of claim 6 further comprising the step of:

(l) inserting an alternative image in place of said object in said video field.

8. The method of claim 1 wherein at least two templates are employed and a distinctive feature is determined to exist when the following total function T is maximized:

$$T\Sigma(\Sigma P\alpha_i(m,n) \pm \Sigma P\alpha_i(m+v,n+h)) = \text{maximum}$$

where T=Total or Sum of function

P=a given line $\alpha_i$=angle of a given line P to abscissa i=2 or more m=location of at least a first search template on the vertical, i.e., ordinate, axis n=location of at least a first search template on the horizontal, i.e., abscissa, axis.

v=vertical offset of at least a second search template from point m h=horizontal offset of at least a second search template from point n.

9. The method of claim 8 wherein said distinctive feature is located at the intersection of two orthogonal straight lines by maximizing the function:

$$T=\Sigma(\Sigma P(col,90,n,m+v)-\Sigma P(row,0,n-h,m)+\Sigma P(row,0,n+h,m)-\Sigma P(col,90,n,m-v))=\text{maximum}.$$

10. A pattern recognition method for recognizing an object having landmark features as imaged in a video field, said method comprising the steps of:

(a) correlating a first template having a first pattern similar to one of said landmark features with respect to said video field and generating a first correlation surface to preliminarily identify at least one candidate landmark feature of said object which could be either a correctly identified landmark feature or one of a plurality of falsely identified landmark features;

(b) correlating a second template having a second pattern with unlike feature correlation with respect to said first template pattern to said candidate landmark feature and generating a second correlation surface to determine if said candidate landmark feature is at least one of said falsely identified landmark features;

(c) correlating a third template having a third pattern with unlike feature correlation with respect to said first and second template patterns over said candidate landmark feature and generating a third correlation surface in order to determine if said candidate landmark feature is at least another of said falsely identified landmark features;

(d) repeating steps (b) and (c) above until all possible likely falsely identified landmark features have been eliminated, (e) selecting said second pattern, wherein said second pattern includes a first element of said landmark feature which extends substantially completely across said second template, wherein said correctly identified landmark feature is accurately identified by process of elimination of said falsely identified landmark features.

11. The method of claim 10 further comprising the step of:

(f) Selecting said third pattern, wherein said third pattern includes a second element of said landmark feature which is extended substantially completely across said third template.

12. The method of claim 11 further comprising the step of:

(g) repeating steps (a)–(f) above to locate at least two potential landmark features of said object; and, (h) geometrically comparing the location of said at least two potential landmark features of said object against a geometric model of said object to further determine if said object has been correctly identified.

13. The method of claim 12 further comprising the step of:

(i) recording a series of consecutive video frames and verifying the accuracy of said method for recognizing an object by testing it against said series of consecutive video frames over a period of time to determine if it has correctly identified said object.

14. The method of claim 13 further comprising the step of:

(j) determining the sub-pixel maximum value of at least a first, second and third pixel each having a top with a midpoint and each having a common baseline by forming a first line through the midpoint of the top of said first and second pixels, said first line forming an angle α with respect to said common baseline and subsequently drawing a second line through the top of the midpoint of said third pixel and having an angle 180°—α with respect to said common baseline, wherein the triangular intersection of said first and second lines approximates the location of the maximum value of said three pixels.

15. The method of claim 14 further comprising the step of:

(k) inserting an always fail flag into the end of each frame tested in step (i) above thereby forcing the method to repeat steps (a)–(f) at least once per frame, wherein an effort is made to recognize said object once each field.

16. The method of claim 15 further comprising the step of:

(l) inserting an alternative image in place of said object in said video field.

17. The method of claim 10 wherein at least two correlation surfaces are generated and a landmark feature is determined to exist when the following total function is maximized:

$$T=\Sigma(\Sigma P\alpha_i(m,n) \pm \Sigma P\alpha_i(m+v,n+h))=\text{maximum}$$

where T=Total or Sum of function

P=a given line $\alpha_i$=angle of a given line P to abscissa i=2 or more m=location of at least a first search template on the vertical, i.e., ordinate, axis n=location of at least a first search template on the horizontal, i.e., abscissa, axis.

v=vertical offset of at least a second search template from point m h=horizontal offset of at least a second search template from point n.

18. The method of claim 17 wherein said landmark feature is located at the intersection of two orthogonal straight lines by maximizing the function:

$$T=\Sigma(\Sigma P(col,90,n,m+v)-\Sigma P(row,O,n-h,m)+\Sigma P(row,O,n+h,m)-\Sigma P(col,90,n,m-v))=\text{maximum}.$$

19. A pattern recognition method for recognizing an object having distinctive features as imaged in a video field, said method comprising the steps of:

(a) passing a first template having a first pattern similar to one of said distinctive features over said video field and comparing the same in order to preliminarily identify at least one possible distinctive feature of said object which could be either a correctly identified distinctive feature or one of a plurality of incorrectly identified features; and, (b) passing a second template having a second pattern different from said first template pattern over said possible distinctive feature and comparing the same in order to determine if said possible distinctive feature is at least one of said incorrectly identified features, wherein said second pattern includes a first element of said distinctive feature which extends substantially completely across said second template.

20. A pattern recognition method for recognizing an object having landmark features as imaged in a video field, said method comprising the steps of:

(a) correlating a first template having a first pattern similar to one of said landmark features with respect to said video field and generating a first correlation surface to preliminarily identify at least one candidate landmark feature of said object which could be either a correctly identified landmark feature or one of a plurality of falsely identified landmark features; and, (b) correlating a second template having a second pattern with unlike feature correlation with respect to said first template pattern to said candidate landmark feature and generating a second correlation surface to determine if said candidate landmark feature is at least one of said falsely identified landmark features, wherein said second pattern includes a first element of said landmark feature which extends substantially completely across said second template.

21. A system for recognizing an object having landmark features as imaged in a video field, said system comprising:

scanning means for scanning said object and forming a series of video fields; and, correlating means for correlating a first template having a first pattern similar to one of said landmark features with respect to said video field and generating a first correlation surface to preliminarily identify at least one candidate landmark feature of said object which could be either a correctly identified landmark feature or one of a plurality of falsely identified landmark features and for correlating a second template having a second pattern with unlike feature correlation with respect to said first template pattern to said candidate landmark feature and generating a second correlation surface to determine if said candidate landmark feature is at least one of said falsely identified landmark features, wherein said second pattern includes a first element of said landmark feature which extends substantially completely across said second template and wherein said correctly identified landmark feature is identified by process of eliminating possible falsely identified landmark features.

22. The system of claim 21 further comprising:

insertion means for inserting an alternative image in place of said object in said video field.

23. A pattern recognition method for recognizing an object having distinctive features as imaged in a video field, said method comprising the steps of:

(a) passing a first template having a first pattern similar to one of said distinctive features over said video field and comparing the same in order to preliminarily identify at least one possible distinctive feature of said object which could be either a correctly identified distinctive feature or one of a plurality of incorrectly identified features;

(b) passing a second template having a second pattern different from said first template pattern over said possible distinctive feature and comparing the same in order to determine if said possible distinctive feature is at least one of said incorrectly identified features;

(c) passing a third template having a third pattern different from said first and second template patterns over said possible distinctive features and comparing the same in order to determine if said possible distinctive feature is at least another of said incorrectly identified features, wherein at least two templates are employed and a distinctive feature is determined to exist when the following total function T is maximized:

$$T=\Sigma[\Sigma P\alpha_i(m,n)\pm\Sigma P\alpha_i(m+v,n+h)]=\text{maximum}$$

where T=Total or Sum of function

P=a given line $\alpha_i$=angle of a given line P to abscissa i=2 or more m=location of at least a first search template on the vertical, i.e., ordinate, axis n=location of at least a first search template on the horizontal, i.e., abscissa, axis.

v=vertical offset of at least a second search template from point m h=horizontal offset of at least a second search template from point n.

24. A pattern recognition method for recognizing an object having landmark features as imaged in a video field, said method comprising the steps of:

(a) correlating a first template having a first pattern similar to one of said landmark features with respect to said video field and generating a first correlation surface to preliminarily identify at least one candidate landmark feature of said object which could be either a correctly identified landmark feature or one of a plurality of falsely identified landmark features;

(b) correlating a second template having a second pattern with unlike feature correlation with respect to said first pattern to said candidate landmark feature and generating a second correlation surface to determine if said landmark feature is at least one of said falsely identified landmark features;

(c) correlating a third template having a third pattern with unlike feature correlation with respect to said first and second template patterns over said candidate landmark feature and generating a third correlation surface in order to determine if said candidate landmark feature is at least another of said falsely identified landmark features, wherein at least two correlation surfaces are generated and a landmark feature is determine to exist when the following total function is maximized:

$$T = \Sigma[\Sigma P\alpha_i(m,n) \pm \Sigma P\alpha_i(m-v, n+h)] = \text{maximum}$$

where T=Total or Sum of function

P=a given line $\alpha_i$=angle of a given line P to abscissa i=2 or more m=location of at least a first search template on the vertical, i.e., ordinate, axis n=location of at least a first search template on the horizontal, i.e., abscissa, axis.

v=vertical offset of at least a second search template from point m h=horizontal offset of at least a second search template from point n.

25. A pattern recognition method for recognizing an object having distinctive features as imaged in a video field, said method comprising the steps of:

(a) passing a first template having a first pattern similar to one of said distinctive features over said video field and comparing the same in order to preliminarily identify at least one possible distinctive feature of said object which could be either a correctly identified distinctive feature or one of a plurality of incorrectly identified features;

(b) passing a second template having a second pattern different from said first template pattern over said possible distinctive feature and comparing the same in order to determine if said possible distinctive feature is at least one of said incorrectly identified features, wherein said second pattern does not match any distinctive feature sought to be recognized and includes at least one extended element different from said first pattern in order to more rapidly distinguish said distinctive features.

26. A pattern recognition method for recognizing an object having landmark features as imaged in a video field, said method comprising the steps of:

(a) correlating a first template having a first pattern similar to one of said landmark features with respect to a video field and generating a first correlation surface to preliminarily identify at least one candidate landmark feature of said object which could be either a correctly identified landmark feature or one of a plurality of falsely identified landmark features; and, (b) correlating a second template having a second pattern with unlike feature correlation with respect to said first template pattern to said candidate landmark feature and generating a second correlation surface to determine if said candidate landmark feature is at least one of said falsely identified landmark features, wherein said second pattern does not match any landmark feature sought to be recognized and includes at least one extended element different from said first pattern in order to more rapidly distinguish said landmark features.

27. A system for recognizing an object having landmark features as imaged in a video field, said system comprising:

scanning means for scanning said object and forming a series of video fields; and, correlating means for correlating a first template having a first pattern similar to one of said landmark features with respect to said video field and generating a first correlation surface to preliminarily identify at least one candidate landmark feature of said object which could be either a correctly identified landmark feature or one of a plurality of falsely identified landmark features and for correlating a second template having a second pattern with unlike feature correlation with respect to said first template pattern to said candidate landmark feature and generating a second correlation surface to determine if said candidate landmark feature is at least one of said falsely identified landmark features, wherein said second pattern does not match any landmark feature sought to be recognized and includes at least one extended element different from said first pattern in order to more rapidly distinguish said landmark features.

* * * * *